(12) United States Patent
Harmer et al.

(10) Patent No.: US 6,401,198 B1
(45) Date of Patent: Jun. 4, 2002

(54) STORING SYSTEM-LEVEL MASS STORAGE CONFIGURATION DATA IN NON-VOLATILE MEMORY ON EACH MASS STORAGE DEVICE TO ALLOW FOR REBOOT/POWER-ON RECONFIGURATION OF ALL INSTALLED MASS STORAGE DEVICES TO THE SAME CONFIGURATION AS LAST USE

(75) Inventors: Tracy D. Harmer, Erie; Curtis H. Bruner, Niwot, both of CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/265,017

(22) Filed: Mar. 9, 1999

(51) Int. Cl.$^7$ .............................................. G06F 9/445
(52) U.S. Cl. ........................................................ 713/1
(58) Field of Search .......................................... 713/1, 2

(56) References Cited

U.S. PATENT DOCUMENTS

| | | | |
|---|---|---|---|
| 5,136,713 A | * 8/1992 | Bealkowski et al. | 713/2 |
| 5,210,875 A | * 5/1993 | Bealkowski et al. | 713/2 |
| 5,517,646 A | * 5/1996 | Piccirillo et al. | 713/1 |
| 5,999,476 A | * 12/1999 | Dutton et al. | 713/2 X |
| 6,047,373 A | * 4/2000 | Hall et al. | 713/1 |

\* cited by examiner

Primary Examiner—Thomas M. Heckler
(74) Attorney, Agent, or Firm—W. Daniel Swayze, Jr.; W. James Brady; Frederick J. Telecky, Jr.

(57) ABSTRACT

An arrangement and method are disclosed herein for operating a computer system including a host computer having system RAM. The host computer uses a BIOS to control the operation of the system. The operation of the system requires the host computer to obtain the BIOS device and store the BIOS within the system RAM. The arrangement and method of the invention allows at least a portion of the BIOS to be stored within the mass memory storage of a mass memory storage peripheral computer device rather than being stored within ROM. The BIOS may be expansion BIOS associated with a particular peripheral computer device or system BIOS associated with the host computer.

18 Claims, 8 Drawing Sheets

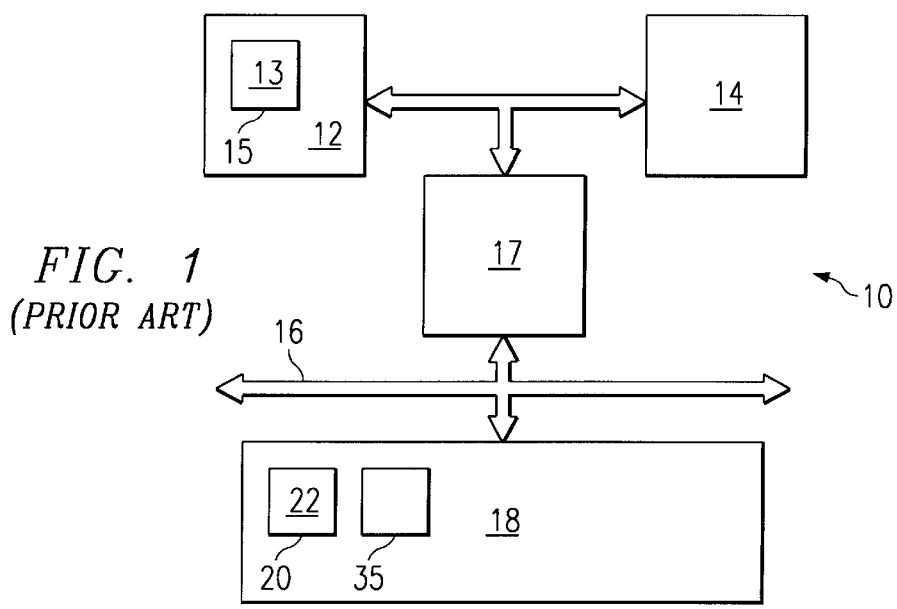
FIG. 1
(PRIOR ART)
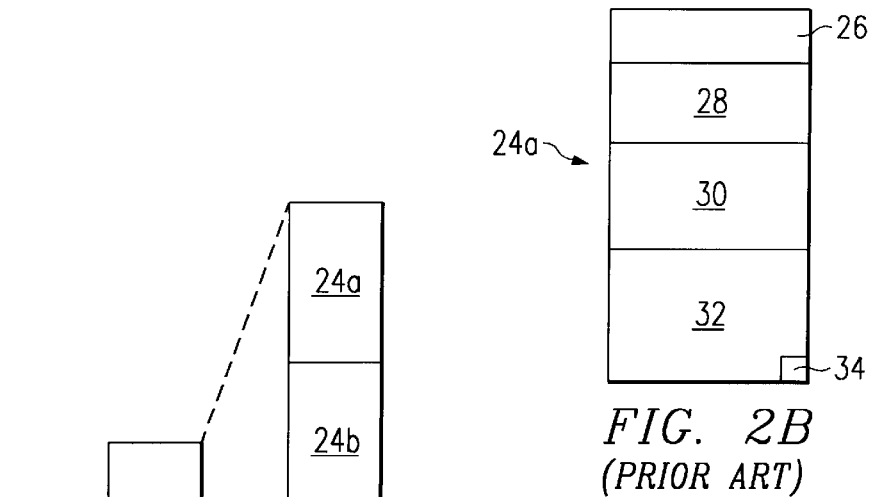
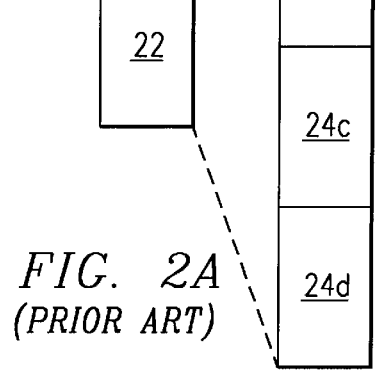
FIG. 2A
(PRIOR ART)
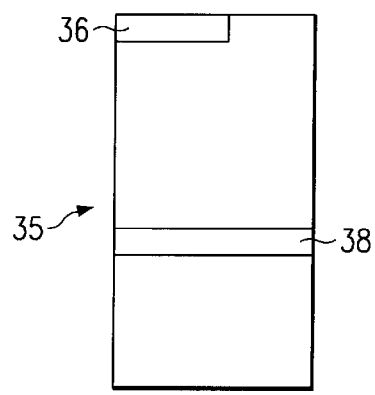
FIG. 2B
(PRIOR ART)
FIG. 2C
(PRIOR ART)

STORING SYSTEM-LEVEL MASS STORAGE CONFIGURATION DATA IN NON-VOLATILE MEMORY ON EACH MASS STORAGE DEVICE TO ALLOW FOR REBOOT/POWER-ON RECONFIGURATION OF ALL INSTALLED MASS STORAGE DEVICES TO THE SAME CONFIGURATION AS LAST USE

FIELD OF THE INVENTION

The present invention relates generally to an arrangement for and method of operating a computer system including a host computer having system Random Access Memory (RAM) and using a Basic Input/Output System (BIOS) to operate the host computer. More particularly the arrangement and method of the invention stores at least a portion of the BIOS used to operate the system within the mass memory storage of a mass memory storage peripheral computer device rather than in Read Only Memory (ROM). The BIOS stored in the mass storage media may be expansion BIOS associated with a particular peripheral computer device and/or system BIOS associated with the host computer. The ROM refers to either system ROM provided by the host computer or peripheral ROM provided by a peripheral device (either on a card or on the device itself).

BACKGROUND OF THE INVENTION

The computer industry is continuously evolving, providing faster processors, larger memory capacities, and a variety of peripheral devices which may be interconnected with a host computer. Due to these increasing speeds and capacities, one of the developments in the industry is a peripheral bus implementation known as Peripheral Components Interface (PCI). This peripheral bus has been developed to provide an expansion mechanism between the host computer and peripheral computer devices or expansion boards.

The PCI peripheral bus is designed to be both processor and computer system architecture independent with the PCI electrical, protocol, and hardware interface requirements remaining the same regardless of the CPU or host system computer architecture being used. This allows the same peripheral computer device to be connected to a variety of different host systems without requiring different versions of the device for each type of host system with which the device is intended to be used. Because the PCI bus is independent of the processor and the computer architecture, each host system is required to provide a mechanism to map host I/O and memory space to the addressing mechanism used on the PCI bus. This is also true of the expansion ROM memory space of a peripheral computer device, which typically includes initializing information and operating information such as code and data for that peripheral computer device. Therefore, relocatable expansion ROM location addresses are allowed on a PCI device. This is not the case for earlier bus architectures such as the Industry Standard Architecture (ISA) Bus.

As shown in FIG. 1, which illustrates one example of a typical PCI-based computer system designated by reference numeral 10, system 10 includes a host computer 12 having a system BIOS 13 for operating host computer 12 and having system RAM memory 14 associate with host computer 12. System BIOS 13 is stored in system ROM 15 within host computer 12. A PCI peripheral bus 16 is connected to host computer 12 and system RAM 14 using a host bridge 17. The system also includes a peripheral computer device 18, for example a hard disk drive, which is connected to the PCI bus such that the host computer may communicate with the peripheral computer device using the PCI bus. Device 18 includes ROM 20 which contains any expansion BIOS 22 required in the host system in order to initialize and/or operate peripheral computer device 18. In a system using the PCI bus, the host system BIOS and/or operating system must provide a configuration manager that recognizes individual PCI devices, allocates resources, and enables those devices. It is the responsibility of the configuration manager to copy any expansion BIOS of the peripheral device into the host computer's RAM and then execute any initialization routine provided within the expansion BIOS to provide proper peripheral device initialization.

Referring to FIG. 2A, which diagrammatically illustrates the expansion BIOS 22 contained in ROM 20, the PCI specification allows for multiple code images, for example 24a–24d, to be stored within the expansion BIOS 22 with each code image providing the appropriate information for a particular computer architecture. In this example, code image 24a might correspond to an Intel® based system, code image 24b might correspond to a Power PC® based system, and so on. These multiple code images 24a–24d increase the amount of information which is included in the expansion BIOS thereby increasing the amount of ROM required to store the expansion BIOS 22. As shown in FIG. 2B, code image 24a, and each of the other images, includes a header region 26. Depending on the requirements of device 18 to which the expansion BIOS 22 corresponds, each image may also include a data structure region 28, runtime code 30, initialization code 32, and a check sum 34. Referring to FIG. 2C, the PCI specification also requires that each PCI device includes a configuration space memory 35 which is 256 bytes in size and which conforms to the PCI format illustrated. The information provided by configuration space 35 includes a device ID register 36 containing the device identification and a configuration register 38 containing a requested amount of memory space. The configuration register 38 specifies the amount of memory space required within the host computer memory to map the expansion BIOS 22 associated with peripheral computer device 18.

As will be described in more detail immediately hereinafter, once expansion BIOS 22 has been copied into host system RAM 14, the initialization code 32 from the proper code image, for example code image 24a, is run. This initializes device 18 and provides the proper hooks into the system for operating device 18 using runtime code 30 from the proper code image, in this case, image 24a, as contrasted with image 24b, c, or d. Once the initialization code has been run, control is returned to the host system and only the code required for operating device 18 is left in host system RAM 14 where it remains throughout the operation of the system. The excess information of the proper code image 24a being only necessary for initialization of device 18 is no longer necessary. Therefore, the memory used to store this excess information is made available to be used again by host computer 12, thereby reducing the usage of RAM 14 to store the necessary portions of expansion BIOS 22.

Referring now to FIG. 3, a typical sequence for obtaining expansion BIOS from a PCI peripheral device and storing it within, system RAM will be described in detail using the example of system 10 described above. After computer system 10 is turned on, indicated in block 40 of FIG. 3, the processor of host computer 12 starts running system code typically called Power-On-Self-Test (POST) as indicated by block 42. The POST code performs unrelated system configurations (block 44) and then starts the configuration of the PCI bus add-on peripheral devices by checking for the presence of peripheral devices, such as peripheral device 18, as indicated by decision box 46. Once the POST code finds peripheral device 18 and as respectively indicated in blocks 48, 50, and 52 of FIG. 3, the POST code starts the configuration of device 18, allocates host I/O and RAM memory space as requested by device 18, and configures interrupt and allocates IRQs on host computer 12 as requested by device 18. At this point, the POST code determines if device 18 has an expansion BIOS that needs to be loaded and configured as indicated by decision block 54. If there is no expansion BIOS, as indicated by clock 56, the POST code goes on to the next peripheral device. If all the devices are configured, the POST code goes on to boot the operating system as shown in block 58. If, however, there is an expansion BIOS to be loaded from the device, as is the case for device 18, the expansion BIOS is loaded and configured as indicated by block 60. Once this loading of the expansion BIOS for device 18 is completed, the sequence proceeds to block 56 and the process continues for any other devices.

Referring now to FIG. 4, the typical process of loading and configuring the expansion BIOS of a peripheral device as indicated in block 54 and 60 of FIG. 3 will be described in more detail. Starting at decision block 54 in which the POST code determines if peripheral device 18 has an expansion BIOS, the POST code writes to and reads from the configuration register 38 of configuration space memory 35 of peripheral device 18 to determine if an expansion BIOS is present on the device and, if so, how much memory space is requested. Once it is determined that there is an expansion BIOS, the process of loading and configuring the expansion BIOS associated with device 18 generally indicated by block 60 of FIG. 3 proceeds as will now be described in detail.

As indicated by block 62 of FIG. 4, the POST code determines an acceptable address to map expansion BIOS 22 stored in ROM 20 of device 18 to and writes that address to the configuration register 38 of configuration space memory 35 on PCI peripheral device 18. In block 64, the POST code then enables expansion BIOS ROM decoding on the device. Next, peripheral device 18 maps its ROM memory starting at the address the POST code wrote to configuration register 38 in configuration space memory 35 on device 18 as indicated in block 66. The device sets up its internal address decoder to decode the memory address range to which the ROM memory is mapped. As indicated in block 68, the POST code reads through the expansion BIOS by reading the memory locations to which the expansion BIOS was mapped, searching for an appropriate expansion BIOS code image, in this case code image 24*a* of expansion BIOS 22. If an appropriate code image is not found, as shown in decision block 70, the sequence returns to block 56 to see if there are additional devices to be configured. However, if proper code image 24*a* is found, the sequence moves to block 72 in which the POST code determines a memory location within host system RAM 14 to copy the expansion BIOS code into from the device's ROM 20. The POST code then in block 74 copies the appropriate code image 24*a* from the device's ROM 20 into system RAM 14. As indicated in blocks 76 and 78, the POST code calls initialization code 32 of expansion BIOS 22 now in system RAM 14 and runs initialization code 32 further configuring peripheral device 18 and installing system level software support including interrupt handlers, device specific data, etc. Once initialization code 32 is finished, initialization code 32 returns control of the system to the POST code as shown in block 80. In block 82, the POST code performs any final initialization such as marking the portion of the system RAM 14 used to store the expansion BIOS remaining in system RAM after initialization code 32 has run as read only. And finally, at this point the sequence returns to decision block 56 to see if there are any more devices present to be configured.

As described above, the expansion BIOS 22 is typically stored in ROM 20 located on the peripheral computer device or an expansion card. However, this approach has the disadvantage of adding to the cost of the device by adding the cost of ROM 20 which in a system using a PCI bus is only used to store the expansion BIOS for loading into the system after system start-up. More particularly, in a system using a PCI bus and as mentioned above, the host computer is required to copy the expansion BIOS into the host system's RAM. For purposes of efficiency, the system uses the copied expansion BIOS stored in its own memory rather than referring back to the ROM on the device when the expansion BIOS is required for the operation of the system. Therefore, once the necessary portions of the proper image 24*a* are stored in the host system's RAM, ROM 20 is not accessed again until the system is turned off and on again at which time the proper image of the expansion BIOS is again loaded into the host system RAM. Also as mentioned above, because multiple images may be required in order to allow the same device to be connected to a variety of host systems having different computer architectures, the size of overall expansion BIOS 22 and therefore ROM 20 required to store the expansion BIOS can be rather large. This can cause the expansion BIOS ROM 20 to become a significant portion of the cost of device 18.

The cost of this expansion BIOS ROM varies depending on the specific type of ROM used. In a case in which high volumes of the devices are being produced, the ROM may be manufactured with the expansion BIOS programmed into the ROM at the time of manufacture of the ROM. This approach has the advantage of being less expensive; however, once this type of ROM is programmed, it may not be changed. If the device is modified in any way which requires a change in the expansion BIOS, or if a bug is found in the expansion BIOS, all of the ROM that have been produced with the old expansion BIOS must be scrapped. This approach does not provide much flexibility in updating and improving the operation of the device by updating the expansion BIOS.

In another approach, the expansion BIOS is programmed into the ROM after the ROM is manufactured. This allows the expansion BIOS to be updated without having to scrap the ROM which have been manufactured as would be the case for the above described approach. Although the programmable ROM provides more flexibility, it is more expensive than ROM which is programmed during its manufacture and further increases the cost of providing the expansion BIOS ROM. With the extremely competitive nature of the computer peripheral device market, for example in the area of hard disk drives, the ability to reduce or even eliminate the cost of the ROM for the expansion BIOS would provide a significant competitive advantage.

The present invention discloses a novel arrangement and method for operating a host computer having a system BIOS which is used to operate the host computer and having system RAM associated with the host computer. The arrangement and method allow at least a portion of the BIOS to be stored within the mass memory storage of a mass memory storage peripheral device which is connected to the host computer. The BIOS stored within the mass memory storage may be expansion BIOS associated with any particular peripheral computer device and/or expansion BIOS associated with the mass memory storage peripheral computer device itself. The BIOS stored within the mass memory storage may also be system BIOS associated with the host computer. This approach significantly reduces or even eliminates the need for and cost of the expansion BIOS ROM for the particular peripheral computer device and/or the expansion BIOS ROM for the mass memory storage peripheral computer device. This approach may also be used to significantly reduce the need for and cost of the system BIOS associated with the host computer. Since some or all of the expansion BIOS and/or some of the system BIOS is stored in the mass memory storage of a mass memory storage peripheral computer device, this approach also provides substantially improved flexibility in updating and improving the system or fixing bugs in the BIOS without having to use programmable ROM. Using this novel approach, the majority of the system BIOS and the majority of, or all of, the expansion BIOS associated with the peripheral devices connected to the system may be updated by simply reloading a revised BIOS into the mass memory storage of the mass memory storage device without having to scrap any BIOS ROM.

SUMMARY OF THE INVENTION

As will be described in more detail hereinafter, an arrangement for and method of operating a computer system is disclosed herein. The computer system includes a host computer having system RAM and a mass memory storage peripheral computer device such as a hard disk drive connected to the host computer. The host computer uses a BIOS to control the operation of the computer system. The arrangement and method allow at least a portion of the BIOS to be stored within the mass memory storage of the mass memory storage peripheral computer device rather than requiring all of the BIOS to be stored within BIOS ROM.

In one embodiment, the method of and arrangement for operating the computer system is a method of and arrangement for operating a particular peripheral computer device connected to the host computer using a peripheral bus in which relocatable expansion BIOS location addresses are allowed, such as a PCI bus. In this embodiment, the BIOS is expansion BIOS associated with the particular peripheral computer device. The operation of the peripheral computer device requires the host computer to obtain the expansion BIOS associated with the particular peripheral computer device and load the expansion BIOS into the system RAM. This embodiment includes ROM storage memory (peripheral ROM) for containing a first portion but not all of the expansion BIOS associated with the particular peripheral computer device. A second portion of the expansion BIOS associated with the particular peripheral computer device is stored within the mass memory storage of the mass memory storage peripheral computer device connected to the host computer. The particular peripheral computer device may or may not be the mass memory storage peripheral computer device. The arrangement further includes an operating mechanism for causing the host computer to access the peripheral ROM and obtain the first portion of the expansion BIOS associated with the particular peripheral computer device. Thereafter, by using the first portion of the expansion BIOS, the host computer is caused to (i) access the mass memory storage of the specific mass memory storage peripheral computer device, (ii) obtain the second portion of the expansion BIOS which is associated with the particular peripheral computer device and which is location within the mass memory storage of the mass memory storage peripheral computer device, and (iii) store the second portion of the expansion BIOS within the system RAM.

In this embodiment, the host computer may include system ROM memory storage containing system BIOS (system ROM). The peripheral ROM storage memory containing the first portion of the expansion BIOS may be separate and apart from the system ROM storage memory, or, alternatively, the peripheral ROM storage memory containing the first portion of the expansion BIOS may be part of the system ROM storage memory. In the case in which the ROM storage memory containing the first portion of the expansion BIOS is separate and apart from the system ROM storage memory, this peripheral ROM storage memory containing the first portion of the expansion BIOS associated with the particular peripheral computer device may be is located on the particular peripheral computer device.

In another embodiment in which the method and arrangement are a method and arrangement of operating a particular peripheral computer device, the entire expansion BIOS associated with the particular peripheral computer device is stored within the mass memory storage of the mass memory storage peripheral computer device. In this embodiment, the method and arrangement further include an operating mechanism for commencing the operation of the system,. Once the operation of the system is commenced, the operating mechanism causes the host computer to (i) access the mass memory storage of the mass memory storage peripheral computer device, (ii) obtain the expansion BIOS associated with the particular peripheral computer device, and (iii) store within the system RAM the expansion BIOS associated with the particular peripheral computer device.

In a specific version of the embodiment which stores the entire expansion BIOS within the mass memory storage of the mass memory storage peripheral computer device, the mass memory storage peripheral computer device includes a memory buffer on the mass memory storage peripheral computer device. In this version, the expansion BIOS associated with the particular peripheral computer device includes a first portion of the expansion BIOS and a second portion of the expansion BIOS. Also, the operating mechanism causes the host computer to perform a Power-On-Self-Test upon the commencing of operation of the, system. The mass memory storage peripheral computer device includes a mechanism for loading the first portion of the expansion BIOS associated with the particular peripheral computer device into the memory buffer of the mass memory storage peripheral computer device within the time frame of the Power-On-Self-Test. This allows the operating mechanism to access the memory buffer and obtain the first portion of expansion BIOS. Thereafter, by using the first portion of the expansion BIOS, the host computer is caused to (i) access the mass memory storage of the mass memory storage peripheral computer device, (ii) obtain the second portion of the expansion BIOS which is associated with the particular peripheral computer device and which is located within the mass memory storage of the mass memory storage peripheral computer device, and (iii) store the second portion of the expansion BIOS within the system RAM.

In each of the above described embodiments, the particular peripheral computer device associated with the expansion BIOS may actually be the mass memory storage peripheral computer device which provides the mass memory storage in which at least a portion of the expansion BIOS is stored. Alternatively, the particular peripheral computer device may be any other peripheral computer device such as a video card, a network card, or any other peripheral computer device or expansion card.

In another embodiment, the BIOS is system BIOS associated with the host computer. In this embodiment a first portion of the system BIOS is contained within a BIOS ROM located within the host computer. A second portion of the system BIOS is stored within the mass memory storage of the mass memory storage peripheral computer device. This second portion of system BIOS is retrieved and stored in system RAM in the same manner as the expansion BIOS stored within the mass memory storage as described previously.

In another aspect of the invention, a computer memory storage medium other than ROM for use in a computer system is disclosed. The computer system includes a host computer having system RAM associated with the host computer and a mass memory storage peripheral computer device which is connected to the host computer. The host computer uses a BIOS to control the operation of the system. At least a portion of the BIOS is stored within the mass memory storage of the mass memory storage peripheral computer device for use by the host computer after the host computer has loaded the BIOS stored in the mass memory storage into the system RAM of the host computer. The computer memory storage medium of the invention has a portion of the memory storage medium containing BIOS for controlling the operation of the host computer. In one embodiment of the computer memory storage medium, the medium is the mass memory storage of the mass memory storage peripheral computer device, such as a hard disk drive, which is connected to the host computer.

In another embodiment of the computer memory storage medium, the medium is a floppy disk or another such medium, and the BIOS contained on the medium is transferable to the mass memory storage peripheral computer device. In this embodiment, the BIOS contained on the medium may be updated and revised BIOS associated with at least a portion of the computer system such as expansion BIOS associated with a particular peripheral computer device connected to the system or system BIOS associated with the host computer. Alternatively, the BIOS contained on the medium may be expansion BIOS associated with a particular peripheral computer device being connected to the computer system.

BRIEF DESCRIPTION OF THE DRAWINGS

The features of the present invention may best be understood by reference to the following description of the presently preferred embodiments together with the accompanying drawings in which:

FIG. 1 is a block diagram of a prior art computer system using a PCI bus to connect a peripheral computer device to a host computer;

FIG. 2A is a diagrammatic illustration of a prior art expansion BIOS containing multiple code images;

FIG. 2B is a detailed diagrammatic illustration of one of the code images shown in FIG. 2A which makes up part of the prior art expansion BIOS;

FIG. 2C is a detailed diagrammatic illustration of a configuration space memory of a PCI peripheral device;

DETAILED DESCRIPTION OF THE PRESENT INVENTION

Figure 5:
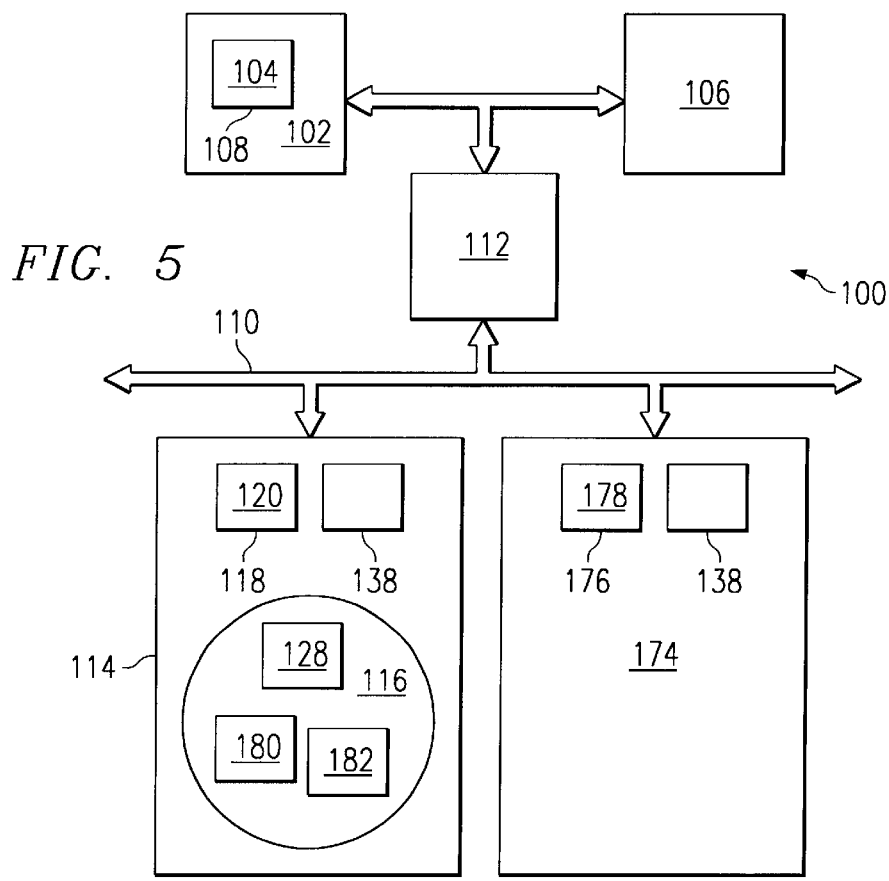
FIG. 5 is a block diagram of one embodiment of a computer system designed in accordance with the present invention which uses a peripheral bus, in which relocatable expansion BIOS location addresses are allowed, to connect a peripheral computer device to a host computer.

Referring to FIG. 5, the present invention will initially be described in terms of an arrangement for allowing a host computer to operate a particular peripheral computer device, the operation of which requires the host computer to obtain expansion BIOS associated with the particular peripheral computer device and load the expansion BIOS into a system RAM. As shown in FIG. 5, a computer system 100 designed in accordance with the present invention includes a host computer 102 having system BIOS 104 which is used to operate host computer 102 and having RAM 106 associated with host computer 102. System BIOS 104 is stored in system ROM 108 within host computer 102. A peripheral bus 110 is connected to host computer 102 and RAM 106 using a host bridge 112. A peripheral computer device 114 is connected to host computer 102 using peripheral bus 110. Host computer 102, system BIOS 104, RAM 106, ROM 108 and host bridge 110 are made up of any suitable and readily providable components which allow host computer 102 and RAM 106 to be connected to peripheral bus 110 using bridge 112. These components include, but are not limited to, any conventional 486, Pentium®, Power PC®, or RISC-based components. Although host computer 102, RAM 106, and host bridge 112 are shown having a particular configuration relative to one another, it should be understood that this is not a requirement of the present invention. Instead, these components may be interconnected in a variety of specific configurations and still remain within the scope of the invention so long as the peripheral computer device 114 is connected to these components using peripheral bus 110 as described hereinafter.

Peripheral bus 110 may be any suitable and readily providable peripheral bus in which relocatable expansion BIOS located addresses are allowed. One preferred embodiment of such a peripheral bus is a PCI bus. However, it should be understood that a wide variety of peripheral buses, such as other parallel buses, serial buses, or multiplexed buses, would also fall within the scope of the present invention. As described in detail above in the background, if a PCI bus is utilized, the PCI specification dictates how any expansion BIOS associated with a particular peripheral computer device is loaded into RAM 106 of the host system. Other peripheral bus configurations have corresponding specifications, and therefore, the present invention will be described in detail assuming that a PCI bus is being used to connect peripheral computer device 114 to host computer 102. The application of the invention to other peripheral bus configurations will become clear to those skilled in the art in view of this disclosure. Although the peripheral bus will be described throughout this specification as being a PCI bus, this is not a requirement. Any peripheral bus which requires the mapping of the expansion BIOS location addresses into the system memory rather than allowing fixed, hard-wired expansion BIOS location addresses would equally apply.

In a first embodiment of the present invention, peripheral computer device 114 is a mass memory storage peripheral computer device having mass memory storage 116 such as a hard disk drive or a compact disk player. Device 114 requires an expansion BIOS associated with the device to be loaded into the host computer in order to properly initialize and operate device 114. Although a hard disk drive and a compact disk player are specifically mentioned, peripheral computer device 114 may take the form of any other mass memory storage device and still remain within the scope of the invention. Mass memory storage peripheral computer device 114 includes a small amount of ROM 118. In accordance with the present invention, ROM 118 includes only a first portion 120 of the expansion BIOS which is associated with device 114.

Figure 6A:
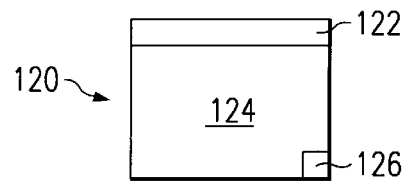
FIG. 6A is a detailed diagrammatic illustration of a first portion of an expansion BIOS in accordance with the present invention for a peripheral computer device.
Figure 6B:
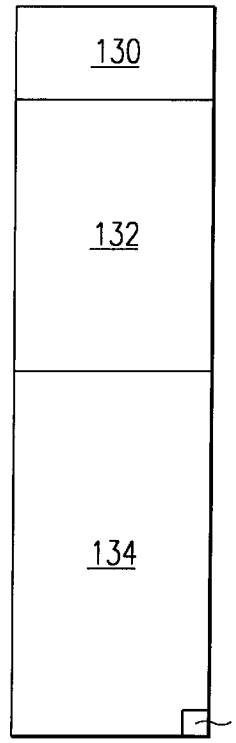
FIG. 6B is a detailed diagrammatic illustration of a second portion of an expansion BIOS in accordance with the present invention which is associated with the first portion of the expansion BIOS illustrated in FIG. 6A.
Figure 6C:
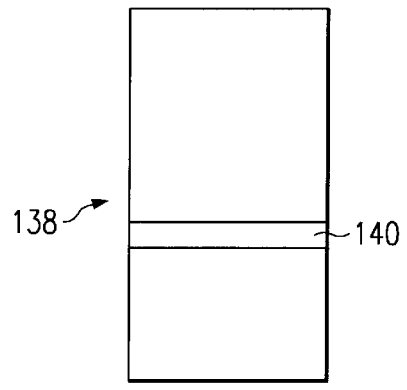
FIG. 6C is a detailed diagrammatic illustration of the configuration space memory of a PCI peripheral device.

Referring to FIG. 6A, when using a PCI bus, first portion 120 of the expansion BIOS includes a configuration header 122, a small amount of initialization code 124, and a check sum 126. The specific information in the configuration header may vary depending on the bus being used; however, the information would be stored according to the protocol of the bus being used. In a preferred version of this embodiment, first portion 120 is a very small portion of the overall expansion BIOS; for example, less than 1K bytes in size. A second portion 128 of the expansion BIOS associated with device 114 is stored in mass memory storage 116. As shown in FIG. 6B, second portion 128 of the expansion BIOS includes any data structure 130 which may be part of the expansion BIOS, any runtime code 132 which may be necessary to operate device 114 during the operation of the system, any initialization code 134 necessary to initialize device 114, and a check sum 136. As shown in FIG. 6C, device 114 also includes a configuration space memory 138 having a configuration register 140 which contains information including a requested size or amount of system memory for mapping the expansion BIOS similar to that described above for the prior art device 18 of system 10. However, in accordance with the present invention, the requested size specifies the amount of memory space required within the host computer to map both the first portion 120 of the expansion BIOS and the second portion 128 of the expansion BIOS associated with peripheral computer device 114.

Although FIGS. 6A and 6B illustrate only one code image making up the first portion 120 and second portion 128 of the expansion BIOS, it should be understood that first portion 120 and second portion 128 of the expansion BIOS may include multiple images, with each of the images corresponding to a different type of computer architecture to which the device may be attached. This multiple image approach would allow the same device to be attached to a variety of systems using different computer architectures which correspond to the different code images. If multiple code images are being provided, the requested size information stored in configuration register 140 of configuration space 138 includes enough space for all of the first and second portion of the code images.

Figure 3:
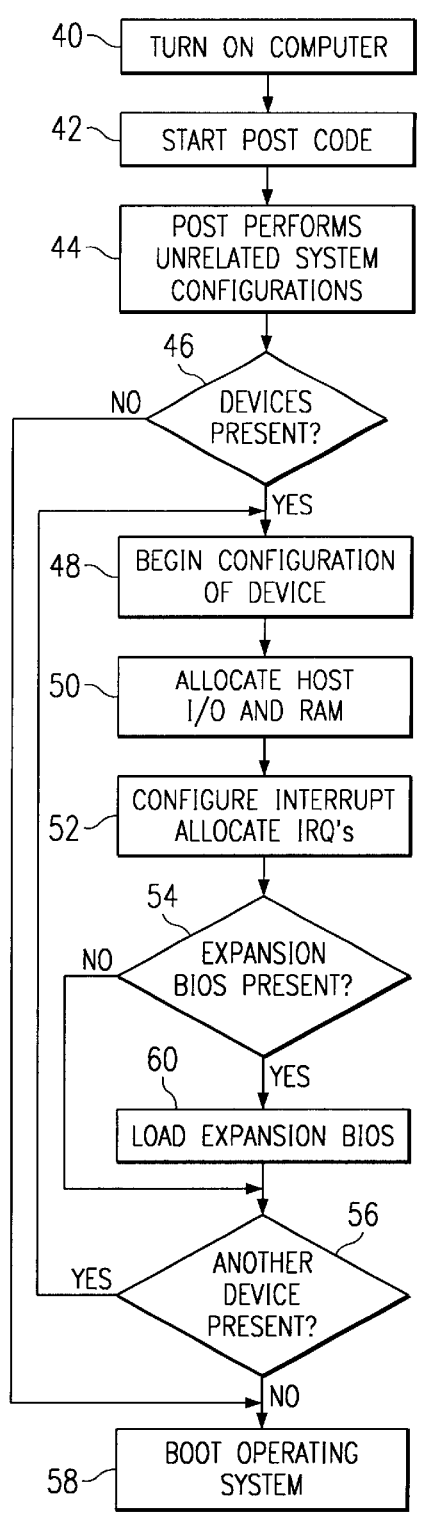
FIG. 3 is a flow chart illustrating a prior art sequence used by a typical PCI-based system to determine whether the system includes any peripheral devices which require the loading of an expansion BIOS into system RAM of a host computer.
Figure 4:
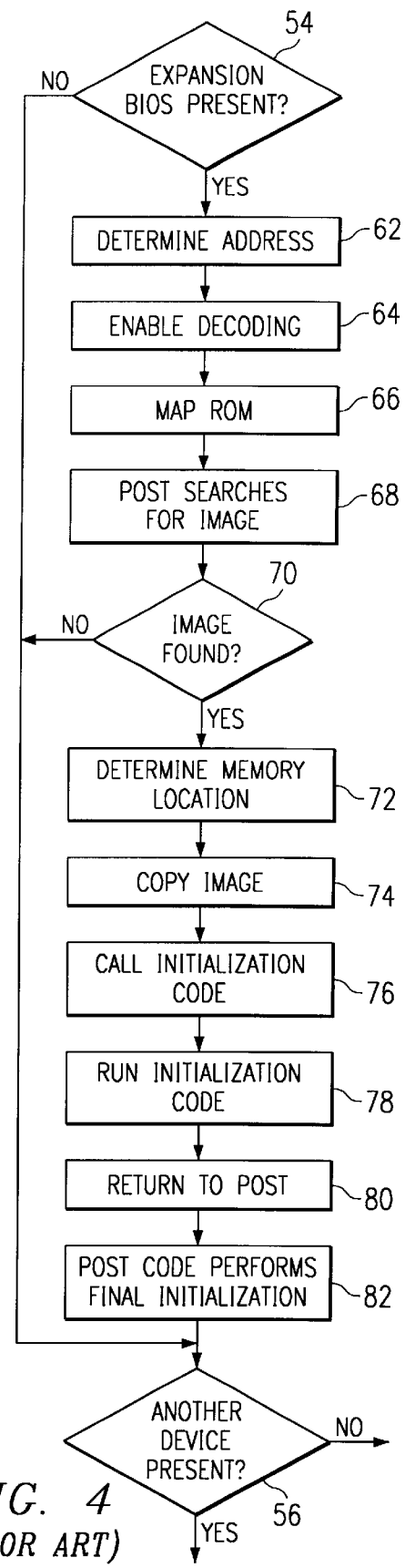
FIG. 4 is a flow chart illustrating the details of how a prior art expansion BIOS associated with a particular peripheral computer device is loaded into system RAM of a host computer.

Now that the elements of this first embodiment have been described, the operation of this embodiment will be described in detail. When overall system 100 is first switched on, the system initially is operated in the same manner as typical system 10 which was described in detail in reference to the flow chart of FIG. 3. However, once the POST code checks system 100 for peripheral devices and determines that there is a peripheral device which includes expansion ROM, in this case device 114, the operation of system 100 begins to differ from the typical system described in reference to the flow chart of FIG. 4. Therefore, the operation of system 100 after this point will be further described in reference to the flow chart of FIG. 7 which would replace the flow chart of FIG. 4 described above for typical PCI-based system 10.

Figure 7:
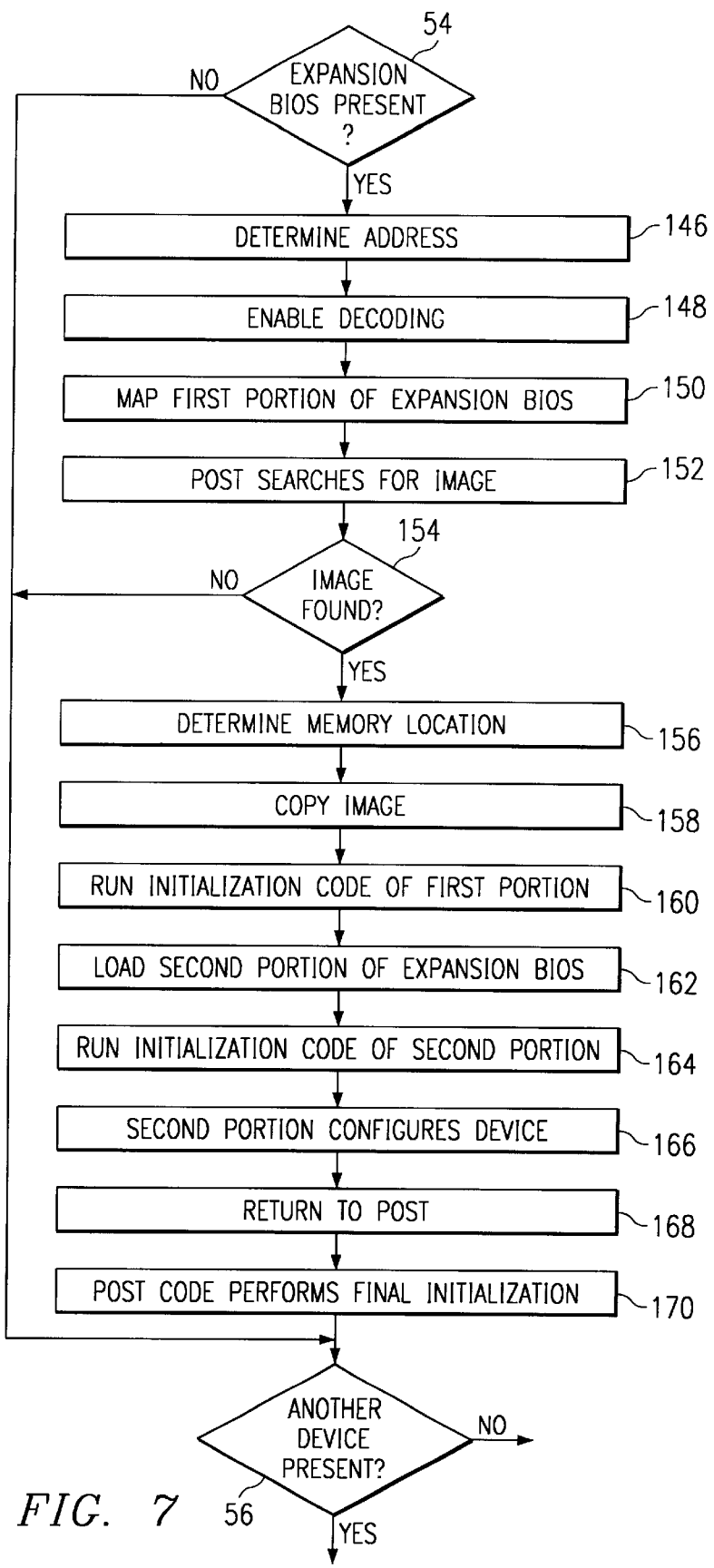
FIG. 7 is a flow chart illustrating the details of how an expansion BIOS as shown in FIGS. 5, 6A and 6B is loaded into system RAM of a host computer in accordance with the present invention.

Starting at decision block 54 of FIG. 7 in which the POST code determines if peripheral device 114 has an expansion BIOS, the POST code writes to and reads from the configuration register 140 of configuration space memory 138 of peripheral device 114 to determine if an expansion BIOS is present on the device and, if so, how much memory space is requested. Once it is determined that this is an expansion BIOS, as indicated by block 146 of FIG. 7, the POST code determines an acceptable address to map the expansion BIOS to and writes that address to the configuration register 140 of configuration space memory 138 on peripheral device 114. In block 148, the POST code then enables expansion BIOS ROM decoding on the device in a manner similar to that described above for system 10.

Next, in accordance with the present invention, peripheral device 114 maps first portion 120 of the expansion BIOS stored in ROM 118 to the system memory address starting at the address the POST code wrote to configuration register 140 in configuration space memory 138 on device 114 as indicated in block 150. Device 114 sets up its internal address decoder to decode the entire memory address range requested by register 140 to which the ROM 118 is mapped, even though only a small portion is actually in ROM 118 of device 114. Because first portion 120 of the expansion BIOS stored in ROM 118 of device 114 is substantially smaller than the requested amount of space requested by register 140 for the overall expansion BIOS as described above, faked generated data is mapped to this excess system memory space. This may be accomplished in a variety of ways. For example, a single data location on ROM 118 may be mapped to all of the excess system memory space, thereby requiring only a single data location to fill the entire excess system memory space. Alternatively, a small data generating code may be provided which is capable of generating data patterns on the fly. In this example, the data generating code is mapped to the excess memory space such that when it is accessed, the data generating code generates the accessed amount of data.

Although only two specific examples of how this excess RAM space is filled are described, a variety of other specific methods may be used, all of which would fall within the scope of the present invention. In a preferred version, all of the excess RAM space is mapped to a single data location within ROM 118 containing first portion 120 of the expansion BIOS. This data location presents a zero as the data for that location. By doing this, all of the excess RAM space is filled with zeros. Since all of the excess RAM space is filled with zeros, this excess space does not affect the check sum counter, and the check sum 126 may be placed at the end of first portion 120 of the expansion BIOS.

As indicated in block 152, the POST code reads through the expansion BIOS by reading the memory locations to which the expansion BIOS was mapped, searching for an appropriate expansion BIOS code image, in this case the only code image included in first portion 120 of the expansion BIOS. If an appropriate code image is not found, as shown in decision block 154, the sequence returns to block 56 to see if there are additional devices to be configured. However, if a proper code image is found, the sequence moves to block 156 in which the POST code determines a memory location within host system RAM 106 to copy the expansion BIOS code into from the device ROM 118. The POST code then in block 158 copies the code image from the device ROM 118 into system RAM 106. This copying includes first portion 120 of the expansion BIOS and the faked generated data described in detail above. As indicated in block 160, the POST code calls the initialization code 124 of the first portion 120 of the expansion BIOS now in system RAM 106 and runs initialization code 124.

In accordance with the invention and as indicated in block 162, initialization code 124 contains just enough code to activate mass memory storage peripheral computer device 114 and load second portion 128 of the expansion BIOS into system RAM 106. Initialization code 124 runs initialization code 134 of second portion 128 now in host RAM as shown in block 164. Although in the example given initialization code 124 includes only enough code to activate mass memory storage device 114, load second portion 128, and run initialization code 134, this is not a requirement of the invention. Initialization code 124 may include more code so long as at least a portion of the expansion BIOS is stored on mass memory storage 114. However, the preferred embodiment would minimize the amount of code stored in ROM 118, thereby reducing the cost of the ROM as much as possible. In block 166, initialization code 134 further configures peripheral device 114 and installs system level software support including interrupt handlers, device specific data, etc. Once initialization code 134 is finished, initialization code 134 returns control of the system to the POST code as shown in block 168. In block 170, the POST code performs any final initialization such as marking the portion of the system RAM 106 used to store the expansion BIOS remaining in system RAM after initialization code 134 has run as read only. And finally, at this point, the sequence returns to decision block 56 to see if there are any more devices present to be configured.

In a second embodiment also illustrated in FIG. 5, the particular peripheral computer device may take the form of a device or expansion card other than a mass memory storage peripheral computer device. Examples of such a device are video cards, multimedia cards, network cards, or any other expansion card or peripheral device which includes an expansion BIOS. In this embodiment, computer system 100 includes a peripheral computer expansion card or device 174 which requires an associated expansion BIOS to be loaded into the host computer in order to initialize and/or operate expansion card 174. In the same manner as described above for device 114, expansion card 174 includes a ROM 176 which contains a first portion 178 of the expansion BIOS associated with expansion card 174. However, in this embodiment, a second portion 180 of the expansion BIOS associated with expansion card 174 is stored in the mass memory storage of device 114. This allows the majority of the expansion BIOS for expansion card 174 to be stored in mass memory storage 116 of a mass memory storage peripheral computer device 114. The operation of this embodiment would be identical to the first embodiment described above except that the small initialization code provided within first portion 178 contained in ROM 176 would operate device 114 and access second portion 180 of the expansion BIOS associated with expansion card 174 contained within mass memory storage 116.

Although both the first and the second embodiments described so far have included ROM 118 and ROM 176 located on the peripheral computer device which requires the loading of expansion BIOS in order to be initialized and/or operated by the host system, this is not a requirement. Alternatively, the ROM containing the first portion of the expansion BIOS may be provided at other locations within the overall system. One example of this may be a situation in which a highly integrated system is provided as a complete package including a particular grouping of peripheral devices. Referring to FIG. 5, in this situation, ROM 118 and 176 which contain the first portion of the expansion BIOS for device 114 and device 174, respectively, may be provided as part of the system ROM 108. The majority of the expansion BIOS associated with the peripheral devices included in the complete package, in this example device 114 and 174, is stored within a mass memory storage device such as a hard disk drive in the same manner as described above. The expansion BIOS ROM required to be included with the system ROM 108 would only need to be large enough to contain code that would operate the hard drive and turn over control to the initialization code stored in the hard drive. All of the expansion BIOS associated with the various peripheral devices included in the package could then be loaded into the RAM of the host system in the same manner as described above. However, in this situation, the first portion of the expansion BIOS for each peripheral device is provided as part of the system BIOS and therefore the system BIOS (that is POST in the previous examples) does not need to search for these peripheral devices as described above.

In accordance with another embodiment of the present invention, this general approach may be used to reduce the amount of system ROM required within the host computer. Still referring to FIG. 5, in this embodiment, system BIOS 104 stored in system ROM is only a small first portion of the overall system BIOS used by host computer 102. A second portion 182 of the system BIOS is stored within mass memory storage 116 of mass memory storage device 114 in the same manner as described above for the peripheral device expansion BIOS. With this arrangement, system ROM 108 only needs to be large enough to store enough code to activate mass memory storage device 114 and load second portion 182 into system RAM 106.

Figure 8:
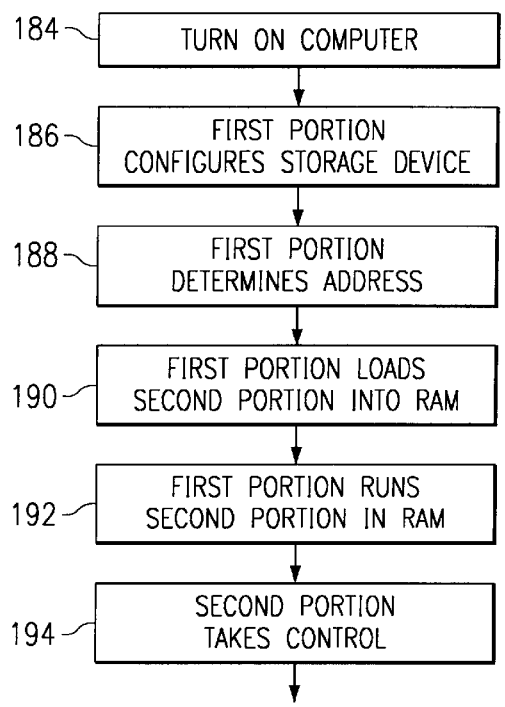
FIG. 8 is a flow chart illustrating how a portion of a system BIOS stored in a mass memory storage peripheral computer device as shown in FIG. 5 is loaded into system RAM of a host computer in accordance with the present invention.

Referring now to the flow chart in FIG. 8, the operation of a system in which the system BIOS is divided into a first portion stored in system ROM 108 and second portion 182 stored within mass memory storage 116 of mass memory storage device 114 will be described in detail. In this arrangement, after the computer is turned on, as indicated in block 184, the first portion of the system BIOS stored in system ROM 108 finds and configures mass memory storage device 114 (block 186). As indicated in block 188, the first portion of the system BIOS includes code which determines an acceptable address to load second portion 182 of the system BIOS into within system RAM 106. Next, in blocks 190 and 192, the first portion of the system BIOS code loads the second portion 182 of the system BIOS from mass memory storage device 114 into system RAM 106 and runs the second portion of the system BIOS which is now in system RAM. At this point, the second portion of the system BIOS takes control, as indicated in block 194, and the system continues to operate in the same manner as if the entire system BIOS were provided within ROM 104.

It should be understood that once the second portion of the system BIOS has been loaded into RAM and executed, the system may continue in accordance with the above described arrangements for loading any expansion BIOS associated with peripheral devices connected to the system. Alternatively, the expansion BIOS may be loaded as will be described in detail hereinafter. Using this overall approach, the majority of the system BIOS, along with the majority of, or even all of, the expansion BIOS of peripheral devices connected to the system may be stored within the mass memory storage of a mass memory storage device connected to the system rather than being stored in ROM. This eliminates the majority of the cost associated with the BIOS ROM required for the system BIOS and expansion BIOS in a typical computer system. Furthermore, taking this same basic concept a step further, additional components of a typical computer system may also be eliminated by storing the information stored in these components within the mass memory storage device. For example, battery backed-up memory which may include system configuration information, passwords, system time, system date, floppy drive configuration data, size, diskette type including disable, 1.44 MB at 3.5 inch, 1.25 MB at 3.5 inch, 7.20 KB at 3.5 inch, 1.2 MB at 5.25 inch, 3.60 KB at 5.25 inch and capacity, diskette write protect enable/disable, hard disk capacity, configuration data and size, CD ROM and DVD configuration data, size and capacity, mass storage device detection method to the type of hard drive, CD ROM and/or DVD peripheral that may be attached to the computer, or any other information typically stored in ROM or battery backed-up memory may also be eliminated by storing this information on the mass memory storage device and accessing it during the startup of the system as described above.

The user typically has the option of setting up the BIOS by selecting either auto (automatic) or manual. If the user selects manual, then the user usually may select at least one of the following: type of drive, either CD or DVD, a number that corresponds to a proprietary drive number or a user-defined configuration that allows the user to select the number of cylinders, number of heads, sector or track, write precompensation, boot sequence, select the order that the system would try to boot from each of storage devices installed in the computer such as disk drive floppy devices, CD ROM drives, and DVD devices, for example, it can be specified to boot off of the floppy drive first, CD ROM drive second, the hard drive third, or any order could be used, enabling and disabling the system speaker, selecting the boot display or video display device, for example with a computer that has a LCD display or a CRT, the LCD could be selected or a TV port, all could come on when you boot or, for example, projection display, any or all could be simultaneously displayed.

Store the current memory size of the host, total memory size, cache RAM or cache memory size, store the current extended memory size of the host, store the host CPU size and the host CPU speed, store the host system number and the BIOS version number, store the selection of quiet boot, enable or disable the television port to allow data to display on TV, select the type of TV signal, for example PAL or NTSC, serial port IRQ (interrupt request line) address, serial port communication port number, COM1, COM2 and COM3, select which COM port used for the wireless communication of device to the computer such as an infrared device, parallel port address such as LPT1, LPT2, disable the address of the above ports, set up operation mode of parallel port (standard mode, bidirection mode and ECP mode).

Typically, if ECP mode is selected, usually then the ECP channel would be selected, also enable and disable passwords such as the user password and the superior password, also set what the password should be, also determining if a password is required on boot, enable or disable the password on resume, store password protection for diskette of a floppy drive, fixed disk boot protection can be set to normal or write protected, enable the integrated hard drive interfaces, select primary integrated adapter, secondary integrated adaptor, both or disable, enable or disable the floppy disk controller, configure the serial port, disable, enable or auto, select disable, enable and auto for serial port configuration, select disable, enable and auto for infrared port configuration, select mode for infrared port or wireless port, IRDA or FIR, select the base I/O address for the infrared port, select the configuration of the parallel port to enable, disable or automatically configure the path by either the system BIOS or the operating system, select the mode of parallel port where the modes include normal, bidirectional ECP or EPP mode, select the configuration of the modem port to enable, disable or automatically configure the port by either the system BIOS or operating system, configure power management, configure the power management mode, always (power management for AC and battery power), battery only, disable (no power management), maximum performance to allow power conservation with optimal system performance, maximum power saving to allow most power saving at expense of system performance, custom, to allow custom setting for different power management features including smart CPU mode with off and on options, standby time out with disable and a predetermined period of time, suspend time out with disable and predetermined period of time, suspend with save to disk or suspend with save to RAM, resume; resume on modem, ring with enable or disable ring, resume on time of day, setting the time to set the resume time, battery low suspend with an enable or disable feature, inactivating timer, enable, disable, resume on alarm with enable or disable by setting the alarm time and alarm date, configure time-out function with disable with a fixed amount of time, stand-by time out, 5-Volt suspend time out, 0-Volt suspend time out, hard disk time out, video time out, language, select primary IDE master, primary IDE slave, secondary IDE master, secondary IDE slave, all that is stored is what is found, select plug-in plug operating system including yes and no, reset configuration data including yes and no options, select system speed fast and compatible to set the speed of the memory cache, select error correction control (ECC) configuration, sets the memory ECC state including ECC or non-ECC, select resource configuration memory reservation to reserve specific memory blocks, IOQ to reserve specific IOQs, select keyboard configuration including NUM lock to set the power on state so that NUM lock is active or nonactive, select keyboard rate to select the keyboard repeat rate (in per sec), keyboard delay select delay before repeat of the keys, select video configuration palette snooping to enable or disable, DMI event logging including event log capacity, event log visibility, DMI event log data, clear the DMI event log, event logging disable or enable, mark the DMI events as read, select the setup password, restore on power loss to restore the last state before power loss occurred, stay off to keep power off until power button is pressed, power on which restores power to the system, quick boot mode enable or disable to skip certain tests while booting.

Figure 9:
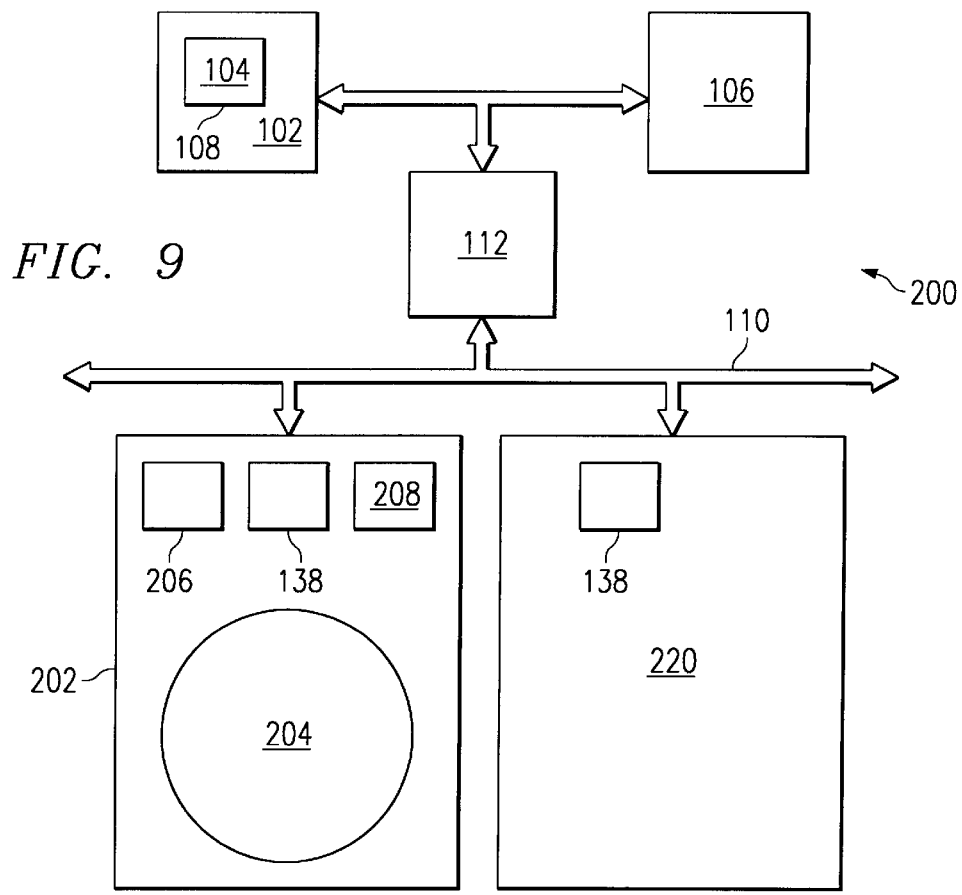
FIG. 9 is a block diagram of another embodiment of a computer system designed in accordance with the present invention which uses a peripheral bus, in which relocatable expansion BIOS location addresses are allowed, to connect a peripheral computer device to a host computer.

In another embodiment of the present invention, the need for an expansion BIOS ROM associated with a particular peripheral computer device is eliminated altogether. Referring to FIG. 9, an overall system 200 includes host computer 102, system BIOS 104, system RAM 106, system ROM 108, host bridge 112, and peripheral bus 110 as described for the previous embodiments. System 200 also includes mass memory storage peripheral computer device 202 having mass memory storage 204. In this embodiment, all of the expansion BIOS associated with device 202 is stored within mass memory storage 204. As mentioned above for other embodiments, device 202 may take the form of a hard disk drive, a compact disk player, or any other form of mass memory storage.

Mass memory storage device 202 further includes a memory buffer 206 for storing data input and output as it is transferred to and from mass memory storage 204. Memory buffer 206 is configured such that it appears to the host system as if it is an expansion ROM installed on device 202 during the startup of the system. In accordance with the present invention, device 202 also includes an intelligent start-up arrangement 208. Start-up arrangement 208 senses when the system is being turned on and, in response to the startup of the system arrangement 208, causes mass memory storage device 202 to quickly turn on and load at least a first portion of the expansion BIOS into memory buffer 206. Arrangement 208 is configured to load this first portion of the expansion BIOS into memory buffer 206 quickly enough that it is available to the host system when POST checks device 202 to see if it requires any expansion BIOS. This first portion of the expansion BIOS is similar to first portion 120 of the expansion BIOS for the first embodiment described above.

Figure 10:
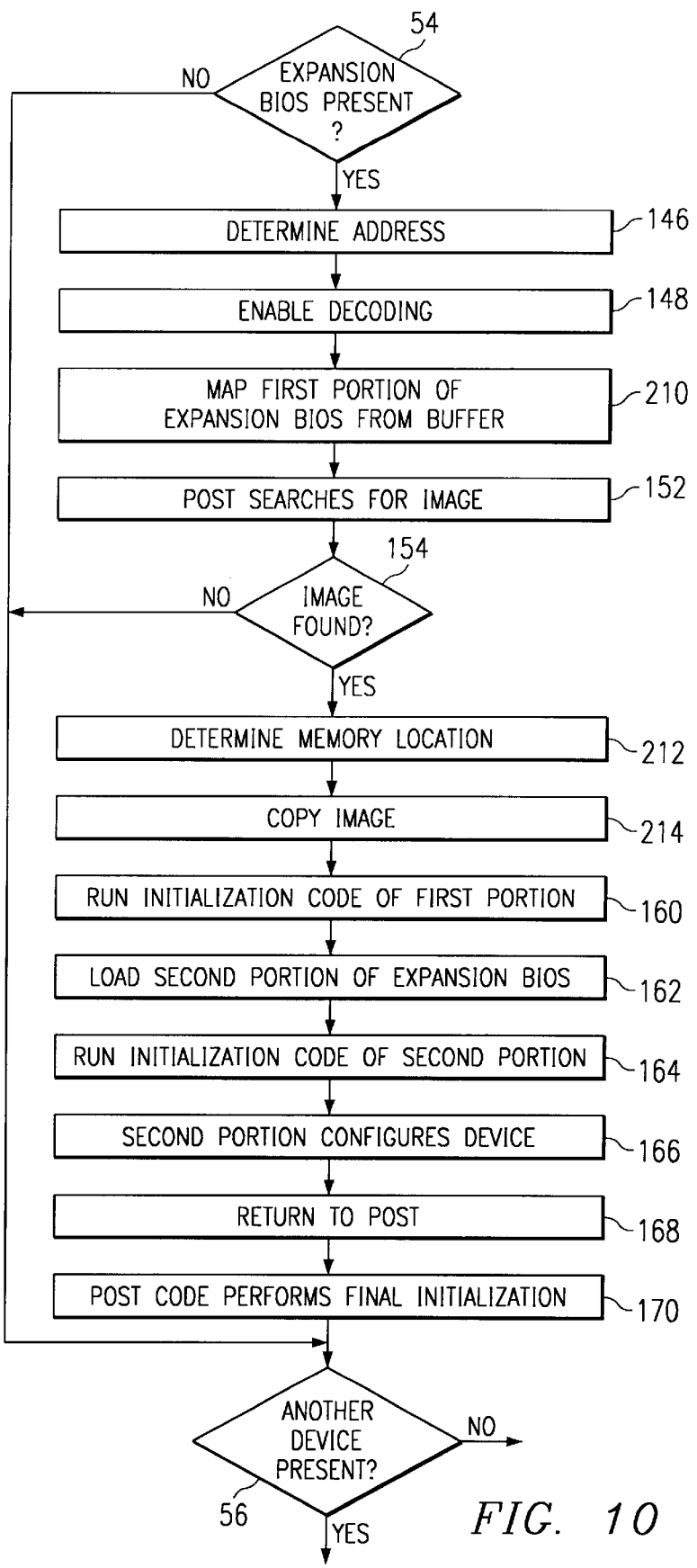
FIG. 10 is a flow chart illustrating the details of a first embodiment of how an expansion BIOS as shown in FIG. 9 is loaded into system RAM of a host computer in accordance with the present invention.

Referring to FIG. 10, this embodiment is operated in much the same manner as was described for the operation of the embodiment illustrated in the flow chart of FIG. 7. As shown in FIG. 10, the first blocks 146 and 148 are the same as described above. However, in this embodiment after the POST code enables expansion ROM decoding, block 150 of FIG. 7 is replaced with block 210 in which device 202 maps its internal memory buffer 206 as expansion BIOS into system memory starting at the address the POST code provided to the configuration space of the device. In the same manner as described in detail above for FIG. 7, faked generated data is mapped to the excess system memory space requested by the configuration space of device 202. Device 202 sets up its internal address decoder to decode the entire memory address range requested by its configuration space even though there is no ROM in device 202.

As was described for previous embodiments, the POST code reads through the expansion BIOS by reading the memory locations to which the expansion BIOS was mapped, searching for an appropriate expansion BIOS code image (block 152). If an appropriate code image is not found, the sequence returns to block 56 to see if there are additional devices to be configured. However, if a proper code image is found, the sequence moves to block 212 in which the POST code determines a memory location within host system RAM 106 to copy the expansion BIOS code to from memory buffer 206 of device 202. The POST code then copies the code image from memory buffer 206 of device 202 into system RAM 106 as indicated in block 214. This copying includes the first portion of the expansion BIOS and the faked generated data described in detail above. As indicated in block 160, the POST code calls the initialization code contained within the first portion of the expansion BIOS now in system RAM 106 and runs the initialization code. The remainder of the operation of this embodiment is identical to that described above for the flow chart of FIG. 7.

Figure 11:
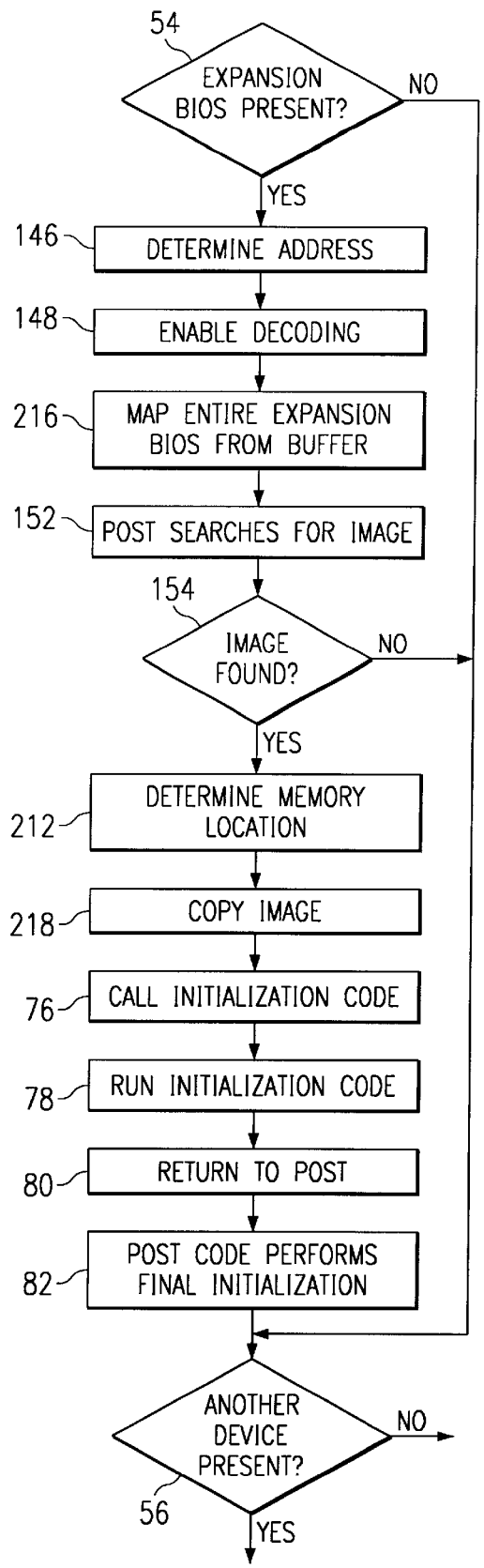
FIG. 11 is a flow chart illustrating the details of a second embodiment of how an expansion BIOS as shown in FIG. 8 is loaded into system RAM of a host computer in accordance with the present invention.

Alternatively, in another version of this embodiment, memory buffer 206 may be mapped into the host system's memory as expansion BIOS for the entire expansion BIOS image, eliminating the need to divide the expansion BIOS into first and second portions. Referring to the flow chart of FIG. 11, this approach will be described. Blocks 54, 56, 146 and 148 remain the same as the embodiment described above for FIG. 10. However, in block 216, device 202 maps its memory buffer 206 as expansion BIOS for the entire expansion BIOS image into system memory starting at the address the POST code provided to the configuration space of device 202. Device 202 reads the expansion BIOS from its mass memory into its memory buffer and maps the image into system memory. If multiple images are provided, they are also mapped into system memory. The device sets up its internal decoder to decode the entire memory range even though there is no ROM on the device. Blocks 152, 154 and 212 are also identical to those described above for FIG. 10. However, in block 218, the POST code copies the appropriate expansion BIOS image which contains the entire expansion BIOS as read off of mass memory storage 204 from memory buffer 206 of device 202 to system RAM 106. From this point on, the operation proceeds through blocks 76, 78, 80 and 82 in the same way as if the expansion BIOS had been loaded from ROM on the device as was described for the prior art system shown in the flow chart of FIG. 4.

Referring back to FIG. 9, another embodiment provides an arrangement in which the expansion BIOS ROM associated with a particular peripheral computer device other than a mass memory storage device is eliminated altogether. In this embodiment, system 200 includes a peripheral computer expansion card or device 220 which requires an associated expansion BIOS to be loaded into the host computer in order to initialize and/or operate expansion card 220. In the same manner as described above for device 202, the expansion BIOS associated with expansion card 220 is stored in mass memory storage 204 of device 202. The operation of this embodiment would be identical to the embodiment described immediately above except that the initialization code stored within mass memory storage 204 would include initialization and runtime code for expansion card 220 as well as initialization code and runtime code for device 202.

One of the advantages of the present invention is that the portion of the expansion BIOS which is stored with the mass memory storage may be easily upgraded. In the case in which the mass memory storage is a hard disk drive, the portion of the expansion BIOS may be stored in a portion of the mass memory storage which is not user accessible. A variety of methods may be used to protect this portion of the hard drive from being accessed during normal operation of the hard drive. In this situation, a utility program may be provided which allows this protected portion of the hard drive to be accessed when and if an update or correction of the portion of the expansion BIOS stored on the hard drive is desired. All of the above described embodiments are able to take advantage of this ability to update and revise the portion of the expansion BIOS which is stored in the mass memory storage of the mass memory storage peripheral device of the system.

The general approach of storing at least a portion of the expansion BIOS on mass memory storage also allows the host system to be configured differently for different situations. An example of this would be when the system is being used for running a particular game or application which may function better when the system is configured in a manner different than during the normal operation of the system. In this situation, the mass memory storage device may be a compact disk player, and the game or application may be provided on a compact disk. Depending on which of the above described approaches is being used, the compact disk itself would contain at least a portion, if not all, of the expansion BIOS. This expansion BIOS on the compact disk would include initialization and runtime code which would optimize the operation of the system for the specific game or application that is being run.

By storing a portion of the expansion BIOS and/or system BIOS on the mass memory storage of the mass memory storage peripheral device, a much larger expansion and/or system BIOS may be provided without increasing the cost of the peripheral device and/or the system. As described above, this general concept of storing information required during the startup of the system may include a variety of operating data, text, or other information that increases the functionality of the system during the startup of the system. One specific example of this is the ability to present more elaborate graphics displays during the startup of the system without having to include a large amount of ROM somewhere within the system in order to contain the desired graphics information.

Figure 12A:
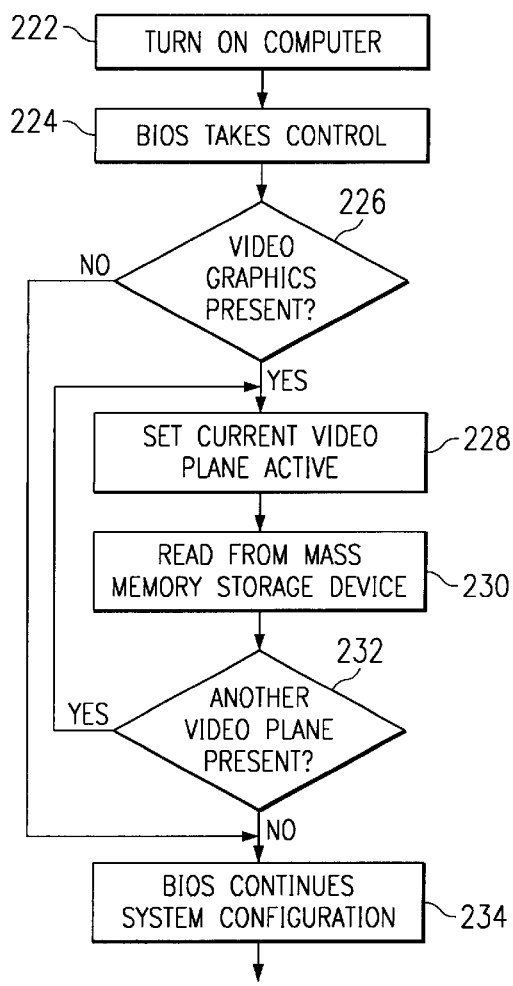
FIG. 12A is a flow chart illustrating how, in accordance with the invention, graphics are loaded from a mass memory storage device into video memory during the startup of a computer system.

Referring to FIG. 12A, the operation of a computer system in accordance with the invention will be described which includes the capability of providing particular graphics information to the system during the startup of the system. As indicated in blocks 222 and 224, the computer is turned on and the initialization code of the BIOS associated with the system takes control of the system. This BIOS may be any of the various BIOS arrangements described above. At this point, as indicated by decision block 226, the initialization code of the BIOS checks to see if the computer system contains video graphics memory. If there is no video graphics memory present, as indicated in block 234, the initialization code of the BIOS goes on configuring the system. However, if there is video graphics memory present, the current video memory plane is set active and the current video memory plane image is read from the mass memory storage device directly into video memory as shown in blocks 228 and 230, respectively. The initialization code of the BIOS then checks to see if there is another video memory plane to be read as indicated in decision block 232. If so, blocks 228 and 230 are repeated until there are no more video memory planes to be read.

Figure 12B:
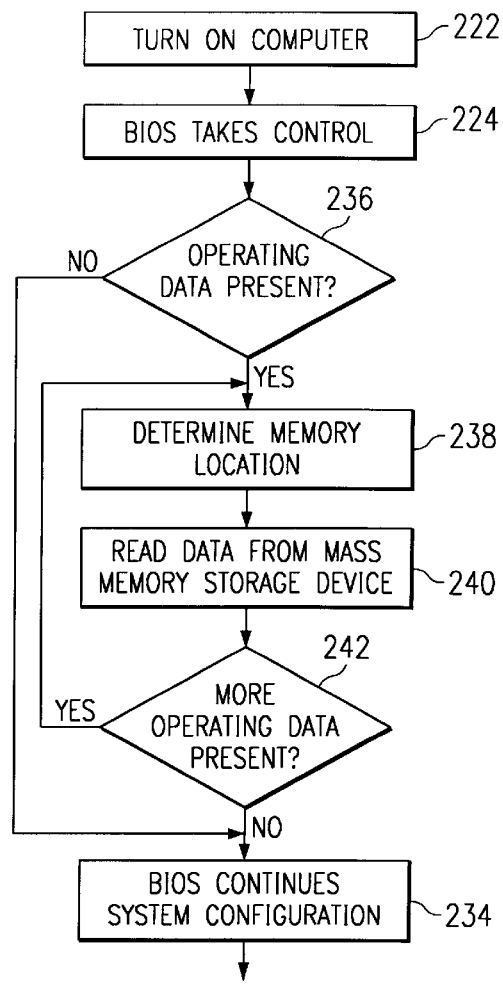
FIG. 12B is a flow chart illustrating how, in accordance with the invention, operating data is loaded from a mass memory storage device into system during the startup of a computer system.

Referring now to FIG. 12B, the same basic approach described above for the graphics example may be used to provide other operating data to the system. This operating data may include, but is not limited to, system configuration information, data, text, passwords, or any other information that may provide some purpose during the startup of the system. As was described above for FIG. 12A, the computer is turned on and the initialization code of the BIOS associated with the system takes control of the system as indicated in blocks 222 and 224. At this point, as indicated by decision block 236, the initialization code of the BIOS checks to see if the mass memory storage device contains operating data to be loaded into the system. If there is no operating data present, as indicated in block 234, the initialization code of the BIOS goes on configuring the system. However, if there is operating data present, the initialization code determines the memory location to load the operating data into, and the operating data is read from the mass memory storage device into system RAM as shown in blocks 238 and 240, respectively. The initialization code of the BIOS then checks to see if there is any more operating data to be read as indicated in decision block 242. If so, blocks 238 and 240 are repeated until there is no more operating data to be read.

As mentioned above, by using the approach described for FIGS. 12A and 12B, operating data or graphics may be provided to the system during the startup of the system without requiring additional ROM storage space for this information. This allows much more information to be provided during the system startup without increasing the cost of the system or peripheral. This approach also allows the cost of ROM or other forms of memory storage such as battery backed-up memory currently used for this purpose to be eliminated, reducing the cost of the system.

Although the peripheral bus has been described throughout as being a PCI bus, this is not a requirement. As mentioned above, any peripheral bus which requires the mapping of the expansion BIOS location addresses into the system memory rather than allowing fixed, hard-wired expansion BIOS location addresses would equally apply. Also, it should be understood that in the embodiments which eliminate entirely the expansion BIOS ROM on a particular peripheral device, the particular peripheral device may still include ROM for other purposes and still remain within the scope of the invention.

Although only a few specific examples of providing an arrangement in which at least a portion of the BIOS or operating data is stored in the mass memory storage of a mass memory storage peripheral computer device have been described, it should be understood that the invention may take on a wide variety of other specific forms. For example, in a system in which several peripheral devices are connected to the host computer, the expansion BIOS for all of the devices may be stored on the mass memory storage device. In this example, the first portion of the expansion BIOS for the mass memory storage device may be loaded into a memory buffer as described above or may be stored in a small expansion BIOS ROM as described above. The second portion of the expansion BIOS for the mass memory storage device along with the expansion BIOS for all of the other peripheral devices may be stored in the mass memory storage of the mass memory storage device and may be accessed using the first portion of the expansion BIOS for the mass memory storage device. Therefore, the present examples are to be considered as illustrative and not restrictive, and the invention is not to be limited to the details given herein, but may be modified within the scope of the appended claims.

What is claimed is:

1. A method for using a computer system including a host computer having system RAM and a mass memory storage peripheral computer device having mass memory storage which is connected to the host computer, the host computer using a BIOS to control its operation during the start-up of the computer system, a method comprising the steps of:

providing access to the host computer during the start-up of the computer system for containing at least a portion of the BIOS;

storing configuration data that corresponds to a configuration of the mass memory storage peripheral computer device within the mass memory storage of the mass memory storage peripheral computer device;

during the start-up of the system, causing the host computer to access and obtain the portion of the BIOS; and by using the portion of the BIOS, causing the host computer to (i) access the mass memory storage of the mass memory storage peripheral computer device, (ii) obtain the configuration data which is located within the mass memory storage of the mass memory storage peripheral computer device, and (iii) store the configuration data within the system RAM.

2. A method for using a computer system, as in claim 1, wherein said configuration data is date data.

3. A method for using a computer system, as in claim 1, wherein said configuration data is time data.

4. A method for using a computer system, as in claim 1, wherein said configuration data is data relating to reading or writing to/from a mass storage device.

5. A method for using a computer system, as in claim 1, wherein said configuration data is data relating to type of the configuration data.

6. A method for using a computer system, as in claim 1, wherein said configuration data is data relating to host data.

7. A method for using a computer system, as in claim 1, wherein said configuration data is data relating to power management.

8. A method for using a computer system, as in claim 1, wherein said configuration data is data relating to keyboard data.

9. A method for using a computer system, as in claim 1, wherein said configuration data is data relating to start-up or initialization.

10. A computer system including a host computer having system RAM and a mass memory storage peripheral computer device having mass memory storage which is connected to the host computer, the host computer using a BIOS to control its operation during the start-up of the computer system, comprising:

a storage accessible to the host computer during the start-up of the computer system for including at least a portion of the BIOS;

the mass memory storage having configuration data of the mass memory storage peripheral computer device;

during the start-up of the system, the host computer being operable to access and obtain the portion of the BIOS; and by using the portion of the BIOS, the host computer being operable to (i) access the mass memory storage of the mass memory storage peripheral computer device, (ii) obtain the configuration data which is located within the mass memory storage of the mass memory storage peripheral computer device, and (iii) store the configuration data within the system RAM.

11. A computer system, as in claim 10, wherein said configuration data is date data.

12. A computer system, as in claim 10, wherein said configuration data is time data.

13. A computer system, as in claim 10, wherein said configuration data is data relating to reading or writing to/from a mass storage device.

14. A computer system, as in claim 10, wherein said configuration data is data relating to type of the configuration data.

15. A computer system, as in claim 10, wherein said configuration data is data relating to host data.

16. A computer system, as in claim 10, wherein said configuration data is data relating to power management.

17. A computer system, as in claim 10, wherein said configuration data is data relating to keyboard data.

18. A computer system, as in claim 10, wherein said configuration data is data relating to start-up or initialization.

* * * * *